United States Patent [19]
Martini et al.

[11] Patent Number: 5,724,823
[45] Date of Patent: Mar. 10, 1998

[54] ABSORPTION OVER-CONCENTRATION CONTROL

[75] Inventors: David M. Martini; Christopher P. Serpente, both of Liverpool; Harold W. Sams, Jamesville; Marvin C. Decker, Skaneateles, all of N.Y.

[73] Assignee: Carrier Corporation, Syracuse, N.Y.

[21] Appl. No.: 728,205

[22] Filed: Oct. 10, 1996

[51] Int. Cl.$^6$ .................................................. F25B 15/00
[52] U.S. Cl. ............................................. 62/148; 62/101
[58] Field of Search ........................... 62/141, 148, 101, 62/476

[56] References Cited

U.S. PATENT DOCUMENTS

| | | | |
|---|---|---|---|
| 3,452,552 | 7/1969 | Johnson | 62/141 |
| 3,550,391 | 12/1970 | Greacen | 62/141 |
| 3,895,499 | 7/1975 | Hopkins | 62/101 |
| 4,445,340 | 5/1984 | Reimann | 62/101 |
| 4,472,947 | 9/1984 | Saito et al. | 62/141 |
| 4,534,180 | 8/1985 | Yasuda et al. | 62/141 |
| 5,592,825 | 1/1997 | Inoue | 62/141 |

FOREIGN PATENT DOCUMENTS

| | | | |
|---|---|---|---|
| 403244973 | 10/1991 | Japan | 62/141 |
| 404371762 | 12/1992 | Japan | 62/141 |

Primary Examiner—William Doerrler

[57] ABSTRACT

An over-concentration control system for use with an absorption machine of the type having either a single, double and triple effect cooling and heating cycle, which uses lithium bromide in solution with water as the operating liquid. The operating liquid being characterized by a concentration indicative of the quantity of lithium bromide dissolved in water, and by a phase diagram having a crystallization boundary that defines the combinations of concentration and temperature which correspond to a condition of saturation in the solution. A sensing means is provided at a predetermined location within the system which is responsive to the depth of said solution for generating a concentration signal indicative of the concentration of the liquid. A temperature sensor is also provided for generating a temperature signal indicative of the temperature of the liquid. Further means are provided which are responsive to the temperature signal and the concentration signal for calculating a representation of the absorption cycle of the machine which may be plotted on a phase diagram for the lithium bromide system. The representation includes a plurality of critical state points which are defined by predetermined respective combinations of concentration and temperature. Means are also provided for comparing the actual concentration and temperature of the liquid to concentrations and temperatures which lie on the said crystallization boundary for lithium bromide for generating a difference signal. Control means are provided which are responsive to the magnitude of the difference signal for changing the operating state of said machine as necessary to prevent the liquid from reaching a combination of concentration and temperature that lies on the crystallization boundary.

15 Claims, 4 Drawing Sheets

5,724,823

1

ABSORPTION OVER-CONCENTRATION CONTROL

FIELD OF THE INVENTION

This invention relates generally to a control system for an absorption liquid chiller, and more specifically to an analog sensor to measure the concentration of lithium bromide in the system.

BACKGROUND OF THE INVENTION

Absorption systems operate with a variety of refrigerant/absorbent pairs, one of which is water/lithium bromide. The concentration of the absorbent is constantly changing from low to high concentrations depending upon which vessels the solution is occupying and the conditions at which the chiller is being controlled to operate. The lithium bromide solution can change from a liquid state to a solid state under certain conditions. This solid state condition is known as crystallization. When crystallization occurs in an absorption chiller, the chiller is not able to function properly and it usually requires a significant and costly effort to correct the problem.

Over-concentration in absorption systems becomes more of a concern as the amount of refrigerant that boils out of the solution increases. The typical method of monitoring this process is to monitor the refrigerant level in the evaporator sump. When the level of the refrigerant reaches a certain point, a discrete level float switch will close and cause the appropriate corrective actions to take place. This is a reactive type of control algorithm, and is predetermined by the height of the level switch. The float cannot anticipate when too much refrigerant is being removed from the solution prior to the single trip point of the switch.

SUMMARY OF THE INVENTION

It is therefore an object of the present invention to provide an improved absorption refrigeration system.

It is a further object of the present invention to provide improved control means to monitor absorption over-concentration.

It is another object to provide an improved control system which overcomes the problems of the prior art described above.

In order to overcome the problems of the prior art described above, the present invention is directed to the use of an analog-type level switch that can respond to the changing refrigerant level in the evaporator. This changing level is a direct indication of the weak solution concentration leaving the absorber sump. Once this concentration is known, along with other measured temperatures, the absorption cycle can be accurately calculated. Once the cycle is known and related to the fluid properties, the point at which crystallization occurs can be monitored and compared to the current operating conditions. If the operating conditions approach the crystallization concentrations, corrective action is taken to reduce the lithium bromide concentration and protect the chiller. Through the use of a microprocessor, the chiller can operate in a proactive manner by keeping the machine away from crystallization rather than simply reacting to high lithium bromide concentrations as is recently now done in the prior art. With this type of control, an absorption unit theoretically should never crystallize (except for an extended power failure or mechanical failure).

BRIEF DESCRIPTION OF THE DRAWINGS

For a fuller understanding of the nature and objects of the invention, reference should be made to the following detailed description of a preferred mode of practicing the invention, read in connection with the accompanying drawings, in which:

FIG. 1b is a schematic illustration of a switch and resistor located at the break away section illustrated by the circle on the support shaft of the switch shown in FIG. 1a.

DETAILED DESCRIPTION OF THE INVENTION

An absorption chiller uses water as the refrigerant in vessels maintained under a deep vacuum. The chiller operates on the simple principle that under low absolute pressure (vacuum), water absorbs heat and vaporizes (boils) at a correspondingly low temperature. For example, at the very deep vacuum of 0.25 in. (6.4 mm) of mercury absolute pressure, water boils at the relatively low temperature of 40 F. (4 C.). To obtain the energy required for this boiling, it takes heat from, and therefore chills, another fluid (usually water). The chilled fluid then can be used for cooling purposes.

To make this cooling process continuous, the refrigerant vapor must be removed as it is produced. To accomplish this, a solution of lithium bromide salt in water is used to absorb the water vapor. Lithium bromide has a high affinity for water, and absorbs it in large quantities under the right conditions. The removal of the refrigerant vapor by absorption keeps the machine pressure low enough for the cooling vaporization to continue. However, this process dilutes the solution and reduces its absorption capacity. Therefore the diluted lithium bromide solution is pumped to separate vessels where it is heated to release (boil off) the previously absorbed water. Relatively cool condensing water from a cooling tower or other source removes enough heat from this vapor to condense it again into liquid for reuse in the cooling cycle. The concentrated lithium bromide solution is then returned to the original vessel to continue the absorption process.

Figure 3:
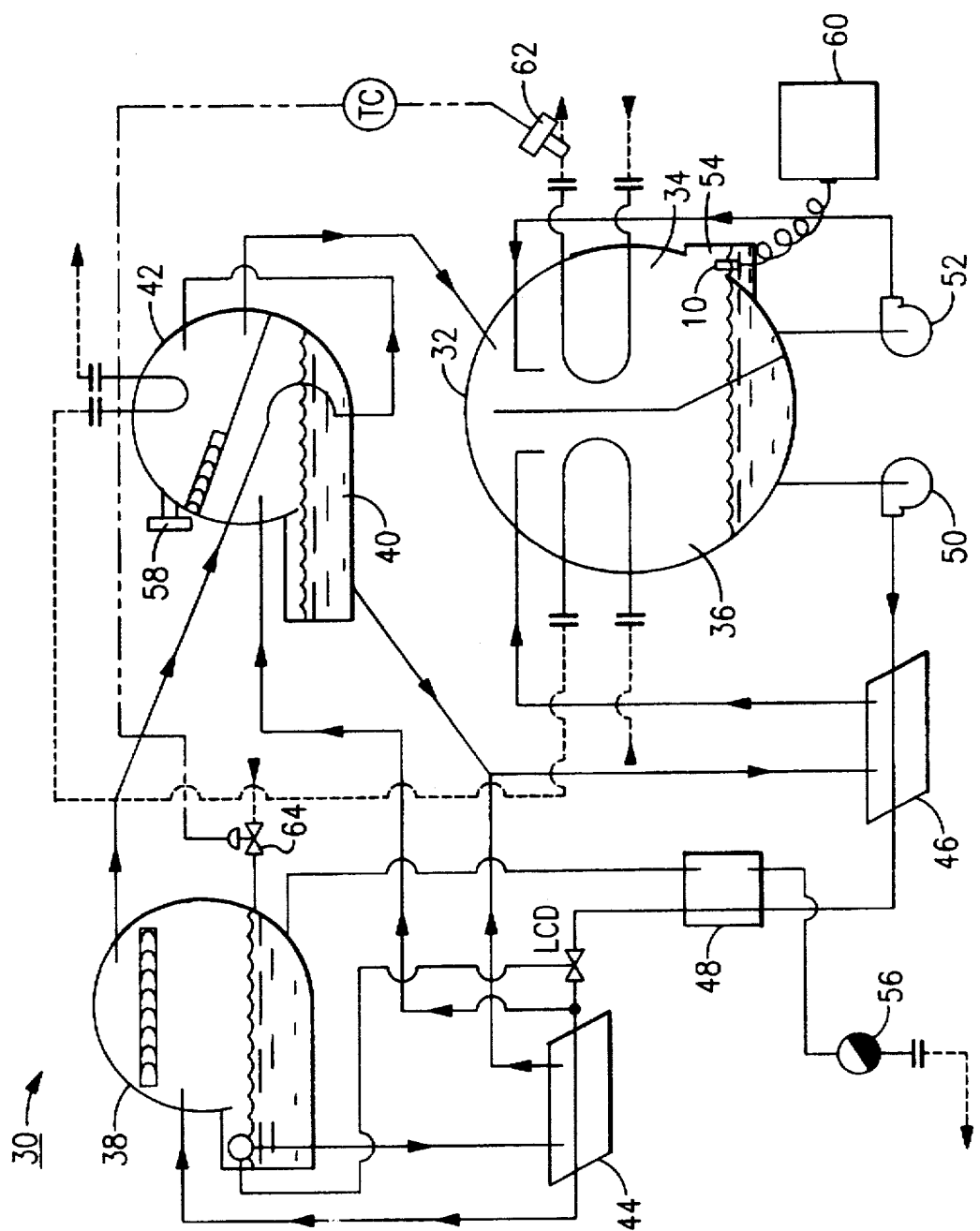
FIG. 3 is a schematic illustration of an embodiment illustrating the flow through a double effect chiller system.

FIG. 3 illustrates the flow through a double effect chiller system 30. The major sections of the chiller machine are contained in several vessels. A large lower shell 32 contains the evaporator and absorber sections 34 and 36, respectively. The evaporator and absorber are positioned as side by side in units. In the evaporator section, the refrigerant water vaporizes and cools the chilled water for the air conditioning or cooling process. In the absorber, vaporized water from the evaporator is absorbed by lithium bromide solution.

Another vessel which is positioned above the evaporator/absorber assembly is the high-stage generator 38. Here, approximately half of the diluted solution from the absorber is heated and reconcentrated to recover slightly over half of the water previously absorbed.

An additional vessel is also positioned above the evaporator/absorber assembly and contains the low-stage generator 40 and condenser 42. The other half of the diluted solution is heated and reconcentrated in the low-stage generator by high temperature water vapor from the high-stage generator. The water vapor released from the solution in this process is condensed to liquid in the condenser section.

This chiller embodiment also has: two solution heat exchangers 44 and 46 and a steam condensate heat exchanger 48 to improve operating economy; an external purge system to maintain machine vacuum by the removal of noncondensables; hermetic pumps 50 and 52 to circulate the solution and refrigerant; and various operational, capacity, and safety devices to provide automatic, reliable machine performance. A capacity valve 64 controls the heat input to the chiller. Additional hardware and components which are normally associated with the chiller system include a drain trap 56, relief valve 58, temperature sensor 62, temperature controller TC and level control device LCD. The arrows in FIG. 3 indicate the direction of flow through the system.

The above described absorption chiller is typical of the absorption chiller machine to which the present invention is applicable. A more complete description of this machine and other typical chillers are set forth in *Start-Up, Operation, and Maintenance Instructions*, Double-Effect Hermetic Absorption Liquid Chillers, Catalog No. 531-607, published by Carrier Corporation which is incorporated herein by reference. It should be understood that this invention also applies to single effect and the various multi-effect absorption cycles.

Figure 1B:
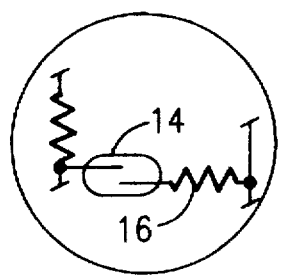
Figure 1A:
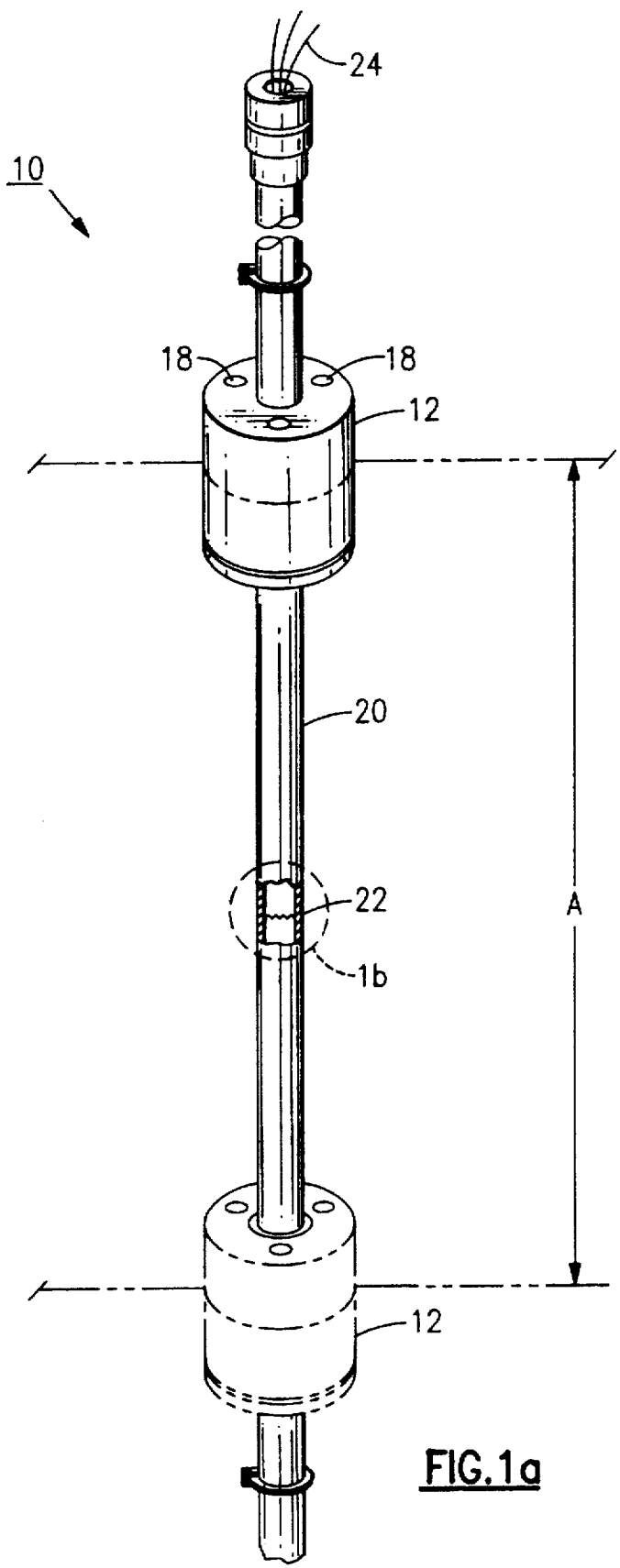
FIG. 1a is a schematic illustration of an analog level switch mechanism suitable for use in the present invention.

In an embodiment of the present invention, an analog level switch 10 is mounted in the evaporator overflow box 54 of a chiller as illustrated in FIG. 3. FIG. 1 is an enlarged view of switch 10. As illustrated in FIG. 1, the distance labeled "A" is a known parameter. As the float 12 travels over distance "A" along a hollow shaft 20 the exact position of the float is determined. A series of reed switches 14 and resistors 16 which are positioned within a cylindrical core member 22 contained within shaft 20 are activated by a set of magnets 18 in the float, act like a potentiometer and continuously change the output voltage which is transmitted through electrical lead wires 24 to microprocessor 60. The voltage that is measured can be directly translated to a concentration using the appropriate calculations. The level switch must be initially calibrated when the unit is installed. There are two significant reasons for this calibration: 1) No two units are identical, the refrigerant volume varies depending on shell sizes and unit size, 2) There are two styles of absorber/evaporator shells (over/under and side by side) which have different refrigerant level relationships. Level switch 10 is available as a component from IMO Industries under the tradename XT Series Level Transmitter.

The units are calibrated when the service technician "trims" or adjusts the refrigerant charge in the unit. The unit is brought to a 50% nominal load condition and stabilized. The technician takes a weak solution sample from the absorber sump and measures the concentration using a hydrometer. The technician then measures the voltage of the level switch and records it into the control algorithm contained in microprocessor 60. The technician then runs the machine to 100% nominal load condition and repeats the procedure. This calibration sets two points on the voltage/concentration curve that fully defines the specific operating parameters for that particular unit.

In order to verify this concept, a chiller was operated at various conditions while recording actual weak solution concentrations (these measurements were made using a hydrometer) and the voltage signal from the level switch. A mathematical relationship is determined from this data.

The results from this testing indicated that for a given concentration, the voltage would always be the same, independent of the conditions at which the chiller was operating. Knowing that a specific voltage has a direct relationship to concentration, the entire operating cycle of the chiller was accurately plotted starting from the voltage readings.

Figure 2:
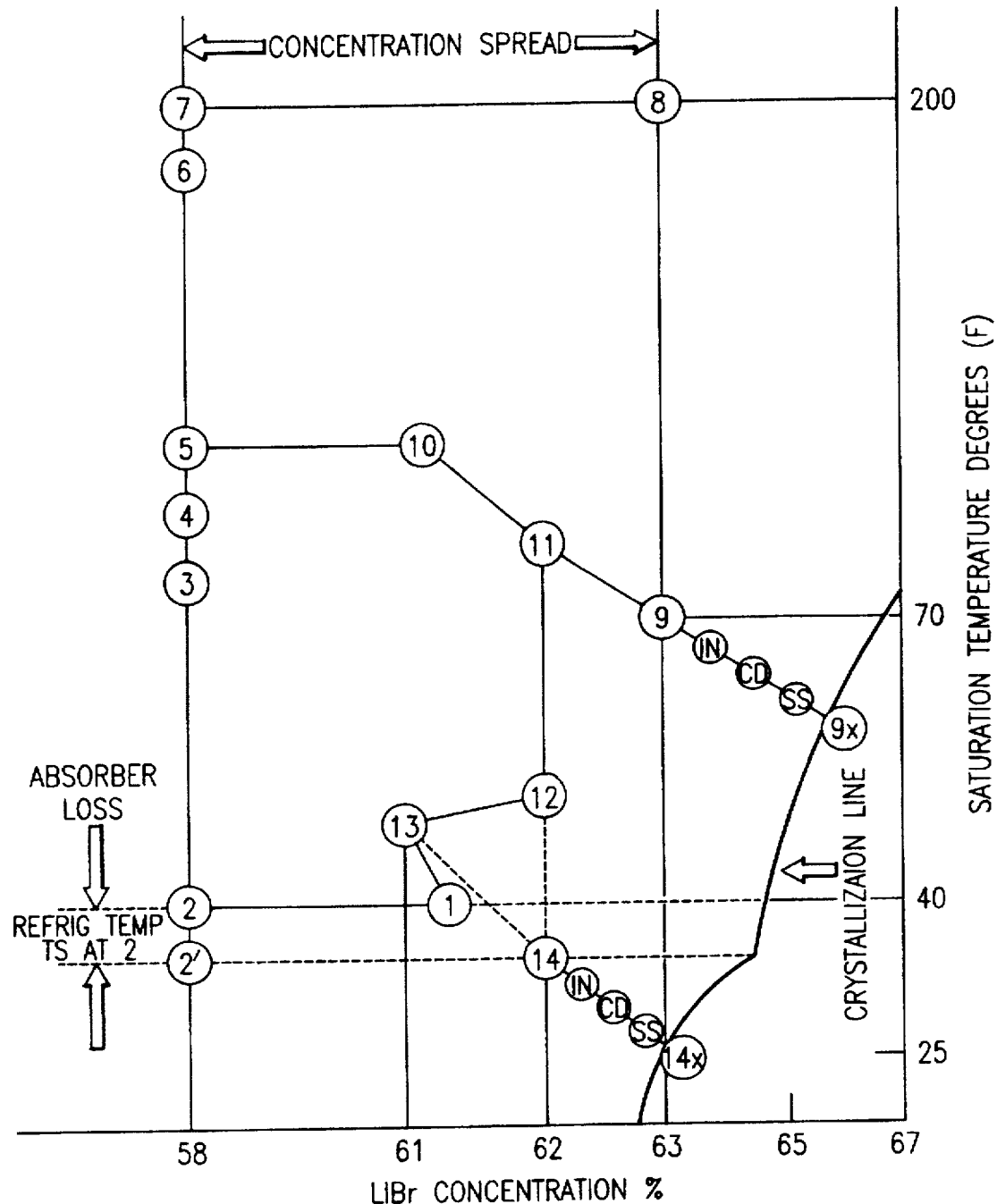
FIG. 2 is a schematic diagram for lithium bromide in water with a plot of the solution cycle for a typical chiller including the crystallization line.
Figure 4:
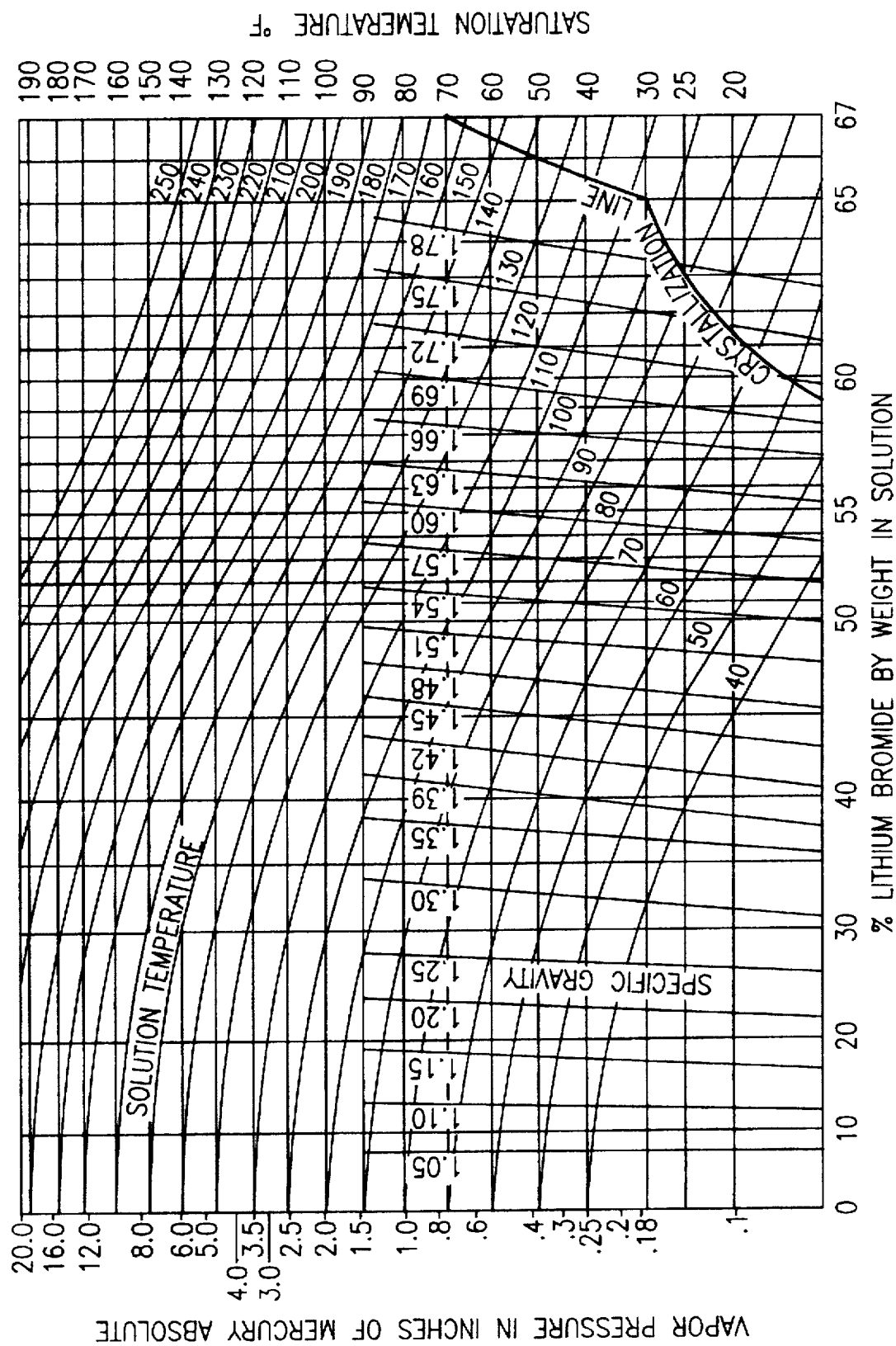
FIG. 4 represents the equilibrium diagram for lithium bromide in water.

Further testing was carried out and incorporated into newly developed control algorithms. These new algorithms are capable of calculating the concentration of the lithium bromide at any state point with good accuracy. FIG. 2 is a schematic diagram which illustrates a typical chiller cycle. The numbered points on the chart correspond to the lithium bromide solution as it travels throughout the chiller. FIG. 4 represents the equilibrium diagram for lithium bromide in water. The solution cycle is illustrated by plotting it on a basic equilibrium diagram for lithium bromide in solution with water. The diagram (FIG. 2) can also be used for performance analyses and troubleshooting.

The left scale on the diagram indicates solution and water vapor pressures at equilibrium conditions. The right scale indicates the corresponding saturation (boiling or condensing) temperatures for both the refrigerant (water) and the solution.

The bottom scale represents solution concentration, expressed as a weight percentage of lithium bromide by weight in solution with water. For example, a lithium bromide concentration of 60% means 60% lithium bromide and 40% water by weight.

In FIG. 4, the curved lines running diagonally left to right are solution temperature lines (not to be confused with the horizontal saturation temperature lines). The single curved line beginning at the lower right represents the crystallization line. At any combination of temperature and concentration to the right of this line, the solution will be crystallized (solidify) and restrict flow. The slightly sloped lines extending from the bottom of the diagram are solution-specific gravity lines. The concentration of a lithium bromide solution sample can be determined by measuring its specific gravity with a hydrometer and reading its solution temperature. Then, plot the intersection point for these two values and read straight down to the percent lithium bromide scale. The corresponding vapor pressure can also be determined by reading the scale straight to the left of the point, and its saturation temperature can be read on the scale to the right.

Plotting the Solution Cycle

An absorption solution cycle at typical full load conditions is plotted in FIG. 2 from Points 1 through 13. These values will vary with different loads and operating conditions.

Point 1 represents the strong solution in the absorber, as it begins to absorb water vapor after being sprayed from the absorber nozzles. This condition is internal and cannot be measured.

Point 2 represents the diluted (weak) solution after it leaves the absorber and before it enters the low-temperature heat exchanger. This includes its flow through the solution pump. This point can be measured with a solution sample from the pump discharge.

Point 3 represents the weak solution leaving the low-temperature heat exchanger. It is at the same concentration as Point 2, but at a higher temperature after gaining heat from the strong solution. This temperature can be measured.

Point 4 represents the weak solution leaving the drain heat exchanger. It is at the same concentration as Point 3, but at a higher temperature after gaining heat from the steam condensate. This temperature can be measured. At this point, the weak solution first flows through the level control device (LCD) valve and then it is split, with approximately half going to the low-stage generator, and the rest going on to the high-temperature heat exchanger.

Point 5 represents the weak solution in the low-stage generator after being preheated to the boiling temperature. The solution will boil at temperatures and concentrations corresponding to a saturation temperature established by the vapor condensing temperature in the condenser. This condition is internal and cannot be measured.

Point 6 represents the weak solution leaving the high-temperature heat exchanger and entering the high-stage generator. It is at the same concentration as Point 4 but at a higher temperature after gaining heat from the strong solution. This temperature can be measured.

Point 7 represents the weak solution in the high-stage generator after being preheated to the boiling temperature. The solution will boil at temperatures and concentrations corresponding to a saturation temperature established by the vapor condensing temperature in the low-stage generator tubes. This condition is internal and cannot be measured.

Point 8 represents the strong solution leaving the high-stage generator and entering the high-temperature heat exchanger after being reconcentrated by boiling out refrigerant. it can be plotted approximately by measuring the temperatures of the leaving strong solution and the condensed vapor leaving the low-stage generator tubes (saturation temperature). This condition cannot be measured accurately.

Point 9 represents the strong solution from the high temperature heat exchanger as it flows between the two heat exchangers. It is the same concentration as Point 8 but at a cooler temperature after giving up heat to the weak solution. The temperature can be measured on those models which have separate solution heat exchangers.

Point 10 represents the strong solution leaving the low-stage generator and entering the low-temperature heat exchanger. It is at a weaker concentration than the solution from the high-stage generator, and can be plotted approximately by measuring the temperatures of the leaving strong solution and vapor condensate (saturation temperature). This condition cannot be measured accurately.

Point 11 represents the mixture of strong solution from the high-temperature heat exchanger and strong solution from the low-stage generator as they both enter the low-temperature heat exchanger. The temperature can be measured on those models which have separate solution heat exchangers.

Point 12 represents the combined strong solution before it leaves the low-temperature heat exchanger after giving up heat to the weak solution. This condition is internal and cannot be measured.

Point 13 represents the strong solution leaving the low-temperature heat exchanger and entering the absorber spray nozzles, after being mixed with some weak solution in the heat exchanger. The temperature can be measured, but the concentration cannot be sampled. After leaving the spray nozzles, the solution is somewhat cooled and concentrated as it flashes to the lower pressure of the absorber, at Point 1.

The following describes how the state points in FIG. 2 are obtained. Point 2 is defined by concentration from the level sensor in conjunction with direct solution temperature measurement.

The refrigerant level sensor voltage is calibrated at a first startup of the machine to accurately establish the relationship between the refrigerant level in the evaporator and the concentration of the lithium bromide solution in the absorber. This shall be done by taking a solution reading at a low and high concentration level and associated refrigerant level sensor voltages. The concentration shall then be interpolated and extrapolated assuming a linear relationship between the two points. Note that the relationship between refrigerant level and the voltage is inverse, i.e., for an increasing level there is a decreasing voltage input.

Point $2^1$ is at the same concentration as Point 2 but at a saturation temperature defined by the refrigerant temperature. The remainder of the points are calculated by the use of state point equations, crystallization line equations, additional sensor information, concentration balances, and mass balances. Points 9X and 14X are defined by use of crystallization line equation at the solution temperatures of points 9 and 14 respectively. These calculations are standard calculations which can be easily carried out by those versed in the art.

Concentration Control Override and Fault Protection

From the above calculation, CONC9 and CONC14 shall be used for overriding the capacity control routine or generating a non-recycle shutdown if the concentration of the lithium bromide should become too high. The concentration protection shall consist of an inhibit threshold, a close threshold, and a safety shutdown threshold (points IN, CD and SS, respectively in FIG. 2) for each calculated concentration (CONC9 and CONC14). When the calculated concentration exceeds the inhibit threshold, the capacity valve 64 shall be inhibited from opening until the calculated concentration drops below the inhibit threshold minus 0.5 percent. If the calculated concentration exceeds the close threshold, the capacity valve 64 shall be closed until it is below the inhibit threshold minus 0.5 percent concentration. If the calculated concentration exceeds its associated safety shutdown threshold then a non-recycle shutdown with dilution cycle shall be initiated.

The concentration thresholds associated with each point are as follows:

| Point | Inhibit (% CONC.) | Close (% CONC.) | Fault/Shutdown (% CONC.) |
|---|---|---|---|
| CONC9 | CONC9X-1.5% | CONC9X-1.0% | CONC9X-0.5% |
| CONC14 | CONC14X-1.5% | CONC14X-1.0% | CONC14X-0.5% |

The above calculation will protect the machine and show the usefulness of the invention during operation. In the advent of a power loss, normal shutdown is not possible. The invention provides for the storage of data prior to power loss. This data is compared to data taken at restoration of power and is used to determine if the solution is crystallized and if it is safe to restart the machine.

Calculate Projected Crystallization Solution Temperatures

TSOL9X=Crystallization Line Equation (CONC9X)

TSOL14X=Crystallization Line Equation (CONC14X)

Calculate Differences and Solution Temperature

DIFF9=TSOL9–TSOL9X

DIFF13=TSOL13–TSOL14X

If(DIFF9<DIFF13) then

TSOL9S=TSOL9–DIFF9
TSOL13S=TSOL13–DIFF9
Else
TSOL9S=TSOL9–DIFF13
TSOL13S=TSOL13–DIFF13

Power Loss Determination for Dilution Cycle

If ((TSOL9<TSOL9S) or (TSOL13<TSOL13S)) then
Alarm State
Else
If((TSOL9<TSOL9S+25) or (TSOL13<TSOL13S+25)) then
Power Loss Dilution Cycle=TRUE
Else
Power Loss Dilution Cycle=FALSE The purpose of the above-described invention is not only to prevent over-concentration of the lithium bromide solution in an absorption machine but also to take preventive measures and attempt to maintain machine operation should the concentration exceed "Normal" operating conditions, thus avoiding unnecessary machine shutdowns. This is accomplished by first determining the critical state points on the machine operating cycle. Typical state points of the two stage operating cycle are shown on the previous chart. Two state points 9 and 14 are determined by temperature and pressure sensors located on the machine used in conjunction with an analog refrigerant level sensor. The level sensor is calibrated during the machine startup to be a direct indicator of weak solution concentration. The level sensor has a voltage output which is directly related to refrigerant level. The refrigerant level is directly related to weak solution concentration.

Two voltage readings are taken corresponding to two or more weak solution concentrations. This data is entered into a microprocessor control system. This develops a relationship that will be used to determine weak solution concentration at any operating condition.

Now other state points can be calculated that will be used to calculate the two designated critical points 9 and 14. These two critical points are compared to points 9X and 14X which are the points where lithium bromide crystallizes. Three pre-determined points are established between the critical points (9 and 14) and the point where lithium bromide crystallizes (9X and 14X at constant lithium bromide temperatures). If state points 9 and 14 reach the first predetermined point then the machine's capacity control valve is inhibited from opening, indicated in FIG. 2 by point "IN". If the second point "CD" is reached the capacity control valve closes until the critical points move away from the crystallization line. If the third point "SS" is reached, the machine will undergo a "SAFETY" shutdown and go into a dilution cycle.

It is also possible to calculate and display "absorber loss" with the information gathered by the sensors and with the equation used to calculate the state points. Absorber loss is the difference between the refrigerant temperature and the lithium bromide saturation temperature in the absorber. This difference, defined in degrees Fahrenheit is an indication of machine performance. A further advantage of the present invention is the capability to store data in the event of a power loss to determine machine readiness when the power is restored.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An over-concentration control system for use with an absorption machine of the type which uses an operating liquid comprising a solution of an ionic solute in a refrigerant solvent, said operating liquid being characterized by a concentration indicative of the quantity of said solute dissolved in said solvent, and by a phase diagram having a crystallization boundary that defines the combinations of concentrations and temperatures which correspond to conditions of saturation in said solution, comprising:

means for storing in a memory, a representational phase diagram of the absorption cycle of said machine, said representational phase diagram including a plurality of predetermined respective combinations of concentrations and temperatures, including those lying on the crystallization boundary;

means responsive to the depth of said solution at a predetermined location in the machine for continuously generating a concentration signal indicative of the concentration of said liquid;

a temperature sensor for generating a temperature signal indicative of the temperature of said liquid;

means for comparing said sensed concentration and temperature of said liquid to said stored combinations of concentrations and temperatures which lie on said crystallization boundary and for generating a difference signal representative thereof; and means responsive to the magnitude of said difference signal for changing the operating state of said machine as necessary to prevent said liquid from reaching a combination of concentration and temperature that lies on said crystallization boundary.

2. An over-concentration control system as set forth claim 1 wherein said means for changing the operating state includes a capacity valve for controlling the heat input to the absorption machine.

3. An over-concentration control system as set forth in claim 2 wherein said means for changing the operating state comprises means for inhibiting said capacity control valve from opening.

4. An over-concentration control system as set forth in claim 2 wherein said means for changing the operating state comprises means for closing said capacity control valve.

5. An over-concentration control system as set forth in claim 2 wherein said means for changing the operating state comprises means for shutting down the machine and going into a dilution cycle.

6. An over-concentration control system as set forth in claim 1 in which the operating liquid comprises a solution of lithium bromide in water.

7. An over-concentration control system as set forth in claim 1 in which the concentration signal generating means comprises an analogue switch which contains a float device.

8. An over-concentration control system as set forth in claim 1 wherein said concentration signal generating means is operative on a continuous basis.

9. An over-concentration control system for use with an absorption machine of the type which uses a water solution of lithium bromide as the operating liquid, said operating liquid being characterized by a concentration of lithium bromide in the water, and by a phase diagram having a crystallization boundary that defines the combinations of lithium bromide concentration and temperature which correspond to a combinations of saturation and said solution, comprising:

means for storing in a memory a representational phase diagram of the absorption cycle of said machine, said representational phase diagram including a plurality predetermined respective combinations of concentrations and temperatures, including those lying on the crystallization boundary;

means responsive to the depth of said solution at a predetermined location in the machine for continuously generating a concentration signal indicative of the lithium bromide concentration of said liquid;

a temperature sensor for generating a temperature signal indicative of the temperature of said liquid;

means for comparing the said sensed concentration and temperature of said liquid to said stored combination of concentrations and temperatures which lie on said crystallization boundary and for generating a difference signal representative thereof; and means responsive to the magnitude of said difference signal for changing the operating state of said machine as necessary to prevent said liquid from reaching a combination of concentration and temperature that lies on said crystallization boundary.

10. An over-concentration control system as set forth in claim 9 wherein said means for changing the operating state includes a capacity control valve for controlling the heat input to the absorption machine.

11. An over-concentration control system as set forth in claim 10 wherein said means for changing the operating state comprises means for inhibiting said capacity control valve from opening.

12. An over-concentration control system as set forth in claim 10 wherein said means for changing the operating state comprises means for closing said capacity control valve.

13. An over-concentration control system as set forth in claim 10 wherein said means for changing the operating state comprises means for shutting down the machine and going into a dilution cycle.

14. An over-concentration control system as set forth in claim 9 in which said concentration signal generating means comprises an analogue switch which contains a float device.

15. An over-concentration control system as set forth in claim 9 wherein said concentration signal generating means is operative on a continuous basis.

* * * * *